US012588108B2

(12) United States Patent
Etxebarrieta Alonso et al.

(10) Patent No.: US 12,588,108 B2
(45) Date of Patent: Mar. 24, 2026

(54) CONTROL METHOD FOR AN OVEN

(71) Applicant: EIKA, S.COOP., Etxebarria (ES)

(72) Inventors: Agustín Etxebarrieta Alonso, Forua (ES); Daniel De Los Toyos López, Eibar (ES)

(73) Assignee: EIKA, S.COOP., Etxebarria (ES)

( * ) Notice: Subject to any disclaimer, the term of this patent is extended or adjusted under 35 U.S.C. 154(b) by 685 days.

(21) Appl. No.: 18/086,930

(22) Filed: Dec. 22, 2022

(65) Prior Publication Data

US 2023/0140673 A1 May 4, 2023

Related U.S. Application Data

(62) Division of application No. 17/116,285, filed on Dec. 9, 2020, now abandoned.

(30) Foreign Application Priority Data

Dec. 11, 2019 (ES) ............................ ES201932025U

(51) Int. Cl.

| | |
|---|---|
| ***H05B 1/02*** | (2006.01) |
| ***F24C 3/12*** | (2006.01) |
| ***F24C 7/08*** | (2006.01) |

(52) U.S. Cl.

CPC ........... *H05B 1/0263* (2013.01); *F24C 3/128* (2013.01); *F24C 7/086* (2013.01); *H05B 1/02* (2013.01)

(58) Field of Classification Search

CPC .......... F24C 3/128; F24C 7/087; F24C 7/086; H01H 19/14; H01H 19/58; H01H 19/08

See application file for complete search history.

(56) References Cited

U.S. PATENT DOCUMENTS

| | | | | |
|---|---|---|---|---|
| 4,596,914 | A | 6/1986 | Morino | |
| 6,930,294 | B2 | 8/2005 | Kim | |
| 2005/0173423 | A1 | 8/2005 | Ho Lee | |
| 2006/0043190 | A1 | 3/2006 | Jeon | |
| 2016/0204955 | A1 * | 7/2016 | Chin ...................... | G08B 21/24 455/66.1 |

FOREIGN PATENT DOCUMENTS

| | | | |
|---|---|---|---|
| CN | 209116394 U * | 7/2019 | |
| EP | 0291302 A2 | 11/1988 | |

* cited by examiner

*Primary Examiner* — Thien S Tran

(74) *Attorney, Agent, or Firm* — Edell, Shapiro & Finnan, LLC

(57) ABSTRACT

A method for controlling an oven that incudes selecting a function of the oven using an actuator located in or on a control panel of the oven to cause an electrical signal to be generated that identifies a function of the oven. In response to the electrical signal being generated, energizing an electrical motor that is mechanically coupled to a rotary position switch and not mechanically coupled to the actuator. The method including rotating the rotary position switch to a position corresponding to the function of the oven by use of the electric motor after the electrical signal is generated.

14 Claims, 2 Drawing Sheets

CONTROL METHOD FOR AN OVEN

CROSS-REFERENCE TO RELATED APPLICATIONS

This application is a divisional of application Ser. No. 17/116,285, filed Dec. 9, 2020, which claims the benefit and priority to Spanish Utility Model Application No. 201932025, filed Dec. 11, 2019.

TECHNICAL FIELD

The present invention relates to control devices for household ovens.

BACKGROUND

Control and display devices for household ovens are known. EP291302A2 describes a household oven comprising heating elements, operating mode selection means, temperature selection means, a temperature sensor, and an electronic control system. The electronic control system is configured so that once the user has selected an operating mode and a temperature by means of using the operating mode and temperature selection means, the control system sends a signal for activating the required heating element.

SUMMARY

Disclosed is a control device for a household oven. The control device includes a control panel comprising at least one actuator configured for selecting at least one function of the oven and generating an electrical signal identifying the function of the oven selected, and a control unit in communication with the control panel configured for receiving the electrical signal generated by the actuator and identifying from the electrical signal the function of the oven selected by means of the actuator. The control device further comprises a rotary position switch configured for rotating and being positioned in a plurality of discrete positions, one of the discrete positions being a reference position, so that in each of the positions the rotary position switch activates at least one function of the oven and in the reference position the rotary position switch does not activate any function of the oven. The control device further comprises an electric motor configured for rotating the rotary position switch and positioning it in one of the discrete positions, the control unit being configured to actuate the electric motor until the rotary position switch is positioned in the position corresponding to the function selected by means of the actuator.

Household ovens having a control panel in which at least one rotary mechanical knob is used for selecting the function of the oven to be used capable of being positioned in a plurality of discrete positions are known in the state of the art. The rotary mechanical knob has a rotating shaft, directly attached to the rotating shaft of a rotary position switch such that they both rotate simultaneously. That is, in ovens of this type known in the state of the art, the knob and the rotary position switch are mechanically coupled to one another. Therefore, based on the final position in which a user positions the rotary mechanical knob, the rotary position switch will activate at least one function of the oven, the function corresponding to said position.

The control device for a household oven of the invention allows the rotary position switch of ovens known in the state of the art to be used with actuators that are not mechanically coupled to the rotary position switch. This makes it possible for the control panel of the oven to be able to comprise actuators of very different types for activating the functions of the oven, using the same rotary position switch.

These and other advantages and features will become apparent in view of the figures and the detailed description.

BRIEF DESCRIPTION OF THE DRAWINGS

FIG. 3 shows an electrical diagram of a part of a third embodiment of the control device.

DETAILED DESCRIPTION

Figure 1:
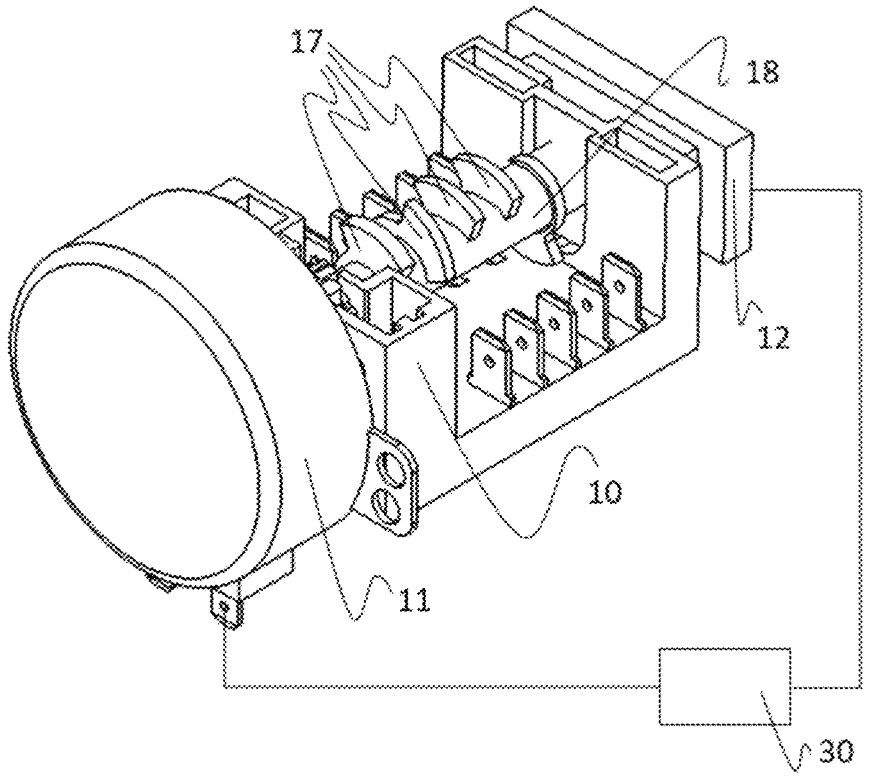
FIG. 1 shows a perspective view of a rotary position switch, an electric motor and a position sensor for the rotary position switch connected to a control unit of a first embodiment of the control device.

The control device for the household oven 1 comprises a control panel 20 comprising at least one actuator 21 configured for selecting at least one function of the oven 1 and generating an electrical signal identifying the function of the oven 1 selected.

The control device includes a control unit 30 in communication with the control panel 20 configured for receiving the electrical signal generated by the actuator 21 and identifying from the electrical signal the function of the oven 1 selected by means of the actuator 21.

The control device includes a rotary position switch 10 configured for rotating and being positioned in a plurality of discrete positions, one of the discrete positions being a reference position. In each of the discrete positions, the rotary position switch 10 activates at least one function of the oven 1, except in the reference position, where the rotary position switch 10 does not activate any function of the oven 1. Rotary position switches, such as rotary cam switches, are known in the state of the art. The rotary position switch 10 of a first embodiment of the control device includes a plurality of cams 17 assembled on a common rotary shaft 18, each of the cams being axially spaced with respect to the previous one on the common rotary shaft so that all the cams rotate in unison when the shaft rotates. Each of the cams is configured for acting on a switch 16 and closing a circuit associated with the switch 16, thereby feeding a load 15 corresponding to a function of the oven 1. In the present invention, each of the circuits will correspond with a function of the oven 1, so that when the circuit is closed, the corresponding function of the oven 1 will be activated. Each load 15 corresponds with an element of the oven 1 configured for performing each of the functions of the oven 1, such as the top heater, lower heater, grill, double grill, fan, light, pyrolysis, etc. When a user positions the actuator 21 in a position in which several functions of the oven 1 are being selected simultaneously, the rotary position switch 10 will be positioned in a position in which several cams will act simultaneously on their associated switches 16, the switches 16 closing their associated circuits, the associated circuits being those corresponding to the functions of the oven 1 selected by means of the actuator 21.

The control device includes an electric motor 11 configured to rotate the rotary position switch 10 and positioning it in one of the discrete positions, the control unit 30 being configured to actuate the electric motor 11 until the rotary position switch 10 is positioned in the position corresponding to the function selected by means of the actuator 21. The electric motor 11 and the control unit 30 are electrically connected, so that once the control unit 30 has identified the function of the oven 1 selected by means of the actuator 21, it sends an electrical signal to the electric motor 11, which will rotate the rotary position switch 10 until positioning it in that position in which the function of the oven 1 selected is activated.

FIG. 1 shows the rotary position switch 10, the electric motor 11, and the control unit 30 of the first embodiment of the control device.

Household ovens having a control panel in which at least one rotary mechanical actuator is used for selecting the function of the oven to be used, capable of being positioned in a plurality of discrete positions, are known in the state of the art. The rotary mechanical actuator has a rotating shaft which is directly attached to the rotating shaft of a rotary position switch such that they both rotate simultaneously. That is, in this type of ovens known in the state of the art, the actuator and the rotary position switch are mechanically coupled to one another. Therefore, based on the final position in which the user positions the rotary mechanical actuator, the rotary position switch will activate at least one function of the oven, the one corresponding to said position.

The control device for a household oven 1 of the invention allows the rotary position switch 10 of the ovens 1 known in the state of the art to be used with actuators 21 which are not mechanically coupled to the rotary position switch 10. This makes it possible for the control panel 20 of the oven 1 to be able to comprise actuators 21 of very different types for activating the functions of the oven 1, using the same rotary position switch 10. It is thus possible to change the aesthetics of the oven 1 to a more modern aesthetic in which the control panel 20 and the actuators 21 are more modern, without changing the manner of activating the functions of the oven 1, which is still mechanical, by means of using the rotary position switch 10.

In the control device of the first embodiment, the control unit 30 is configured for identifying the reference position from among all the discrete positions, so that each discrete position in which the rotary position switch 10 is positioned is identified based on the number of positions that the rotary position switch 10 has been rotated by the electric motor 11 with respect to the reference position. As described above, the reference position is that position of the actuator 21 in which no function of the oven 1 is activated, and it is preferably identified in the actuator 21. The user selects the reference position in the actuator 21 when he or she does not want any function of the oven 1 to be activated.

The control unit 30 is configured for identifying the reference position based on the signal received from the actuator 21. Furthermore, the control unit 30 is configured for knowing how many positions separate each discrete position from the reference position. Therefore, starting from the reference position, the control unit 30 is configured for activating the electric motor 11 until the rotary position switch 10 is rotated to the discrete position selected. Likewise, the control unit 30 is configured for calculating how many positions separate one discrete position from another, so it is also configured for activating the electric motor 11 until the rotary position switch 10 is rotated to the discrete position selected starting from any previous discrete position when, during operation of the oven 1, the user acts on the actuator 21 by deselecting the function of the oven 1 that was previously selected, by selecting an additional function of the oven 1, or by changing the function of the oven 1 previously selected to another function In the first embodiment of the control device, the control unit 30 comprises a memory configured for storing the discrete position in which the rotary position switch 10 is positioned at all times. Therefore, when the user selects a new discrete position by means of the actuator 21, the control unit 30 knows which is the discrete position in which the rotary position switch 10 is positioned in the moment in which the user makes the selection, and it is configured for activating the electric motor 11 until the rotary position switch 10 is rotated to the discrete position selected.

In the first embodiment of the control device, the control unit 30 is configured for actuating the electric motor 11 until the rotary position switch 10 is positioned in the reference position, and then for actuating the electric motor 11 until the rotary position switch 10 is positioned in the position corresponding to the function selected by means of the actuator 21 when power supply is restored after an interruption in the power supply. The control device comprises a power supply unit connected with the power supply. The control unit 30 is configured for detecting the interruption in the power supply, so that after the power supply has been interrupted, when power supply has been restored, the control unit 30 is configured for actuating the electric motor 11 until the rotary position switch 10 is positioned in the position corresponding to the function selected by means of the actuator 21, by first actuating the electric motor 11 until the rotary position switch 10 is positioned in the reference position, and then by actuating the electric motor 11 until the rotary position switch 10 is positioned in the position corresponding to the function selected by means of the actuator 21.

In the first embodiment, the control device comprises a position sensor 12 for the rotary position switch 10 in communication with the control unit 30. The position sensor 12 shown in FIG. 1 is configured for providing to the control unit 30 an initial position of the rotary position switch 10, which is the position in which the rotary position switch 10 is located. The control unit 30 is configured for actuating the electric motor 11 until the rotary position switch 10 is positioned in the position corresponding to the function of the oven 1 selected by means of the actuator 21 from the initial position, i.e., taking into account that the starting initial position is the position provided by the position sensor 12.

During the operation of the oven 1, the user may act on the actuator 21 by deselecting the function of the oven 1 that was previously selected, by selecting an additional function of the oven 1 or by changing the function of the oven 1 previously selected to another function. The control unit 30 and the position sensor 12 for the rotary position switch 10 are electrically connected, so that when the control unit 30 receives from the actuator 21 a change in the functions of the oven 1 selected, the control unit 30 identifies the initial position in which the rotary position switch 10 is located based on the initial position provided by the position sensor 12. The control unit 30 then identifies a final position, which is the position in which the rotary position switch 10 must be positioned for activating the function or functions of the oven 1 selected by means of the actuator 21 or actuators 21, and based on that it calculates the signal to be sent to the electric motor 11 for it to rotate the rotary position switch 10 from the initial position to the final position.

In the first embodiment of the control device, the position sensor 12 is integrated in the rotary position switch 10. However, in another embodiment the position sensor 12 is integrated in the electric motor 11.

As is shown in FIG. 1, in the first embodiment the position sensor 12 is a potentiometer. However, in another embodiment the position sensor 12 is a rotary encoder.

In the first embodiment of the control device, the electric motor 11 is directly attached to the rotary position switch 10. As is shown in FIG. 1, the shaft of the electric motor 11 and the shaft of the rotary position switch 10 are coaxially attached, so that the rotation of the shaft of the electric motor 11 causes the rotation of the shaft of the rotary position switch 10.

The control panel 20 of the control device of the first embodiment is an electronic control panel 20. The control device of the first embodiment allows the rotary position switch 10 used in the ovens 1 known in the state of the art to be used with the electronic control panel 20. This makes it possible for the aesthetics of the oven 1 to be more modern than the aesthetics of the ovens 1 known in the state of the art, maintaining the use of the same rotary position switch 10.

In the control device of the first embodiment, the function of the oven 1 is selected by pushing on the actuator 21.

In the first embodiment of the control device, at least one actuator 21 is a button.

In another embodiment of the control device, at least one actuator 21 is a capacitive touch sensor.

In another additional embodiment of the control device, at least one actuator 21 is a rotary knob.

Figure 2:
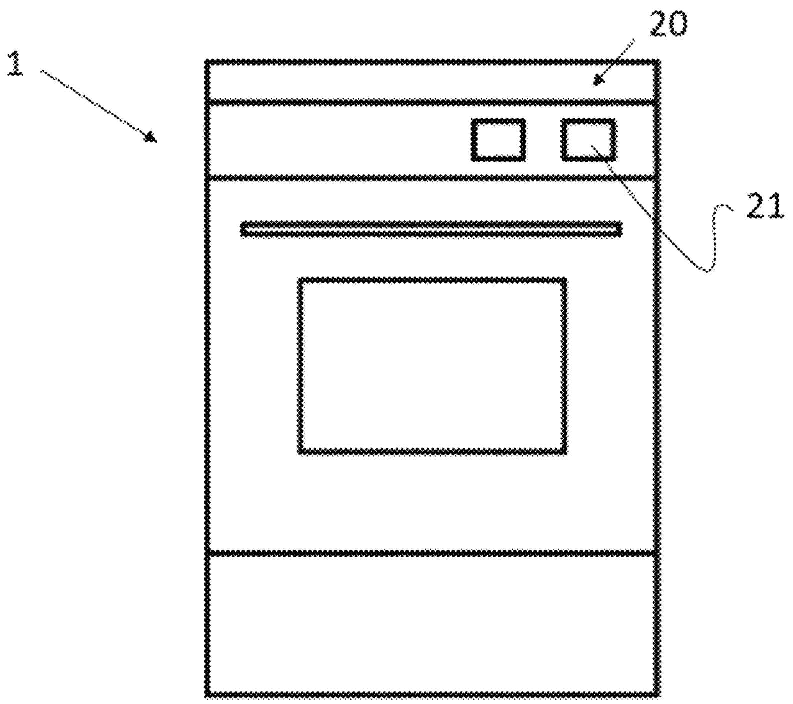
FIG. 2 shows a front view of an oven with a second embodiment of the control device.

In a second embodiment of the control device shown in FIG. 2, the control panel 20 comprises a display screen and a touch screen, the actuator 21 being an area of the touch screen.

In the first embodiment of the control device, the control unit 30 is configured for receiving an electrical signal identifying a temperature inside a cavity of the oven 1 generated by a temperature sensor and identifying from the electrical signal the temperature inside the cavity of the oven 1. The temperature sensor is configured for detecting the temperature inside the cavity of the oven 1 and generating the electrical signal identifying the temperature inside the cavity of the oven 1. When the control unit 30 receives the electrical signal generated by the temperature sensor, it is capable of identifying the temperature inside the cavity of the oven 1 from the electrical signal.

The rotary position switch 10 comprises a plurality of switches 16, each switch 16 being associated with a circuit into which a load 15 corresponding to a function of the oven 1 is fed. The control device comprises at least one input relay 13 arranged in series with at least one switch 16 of the rotary position switch 10 and before the switch 16. The control unit 30 is configured for opening the input relay 13 when the temperature inside the cavity of the oven 1 is greater than a maximum temperature and for closing the input relay 13 when the temperature inside the cavity of the oven 1 is less than a minimum temperature, the maximum temperature being equal to a target temperature selected through a temperature actuator plus a higher differential, and the minimum temperature being equal to the target temperature minus a lower differential.

The input relay 13 of the first embodiment of the control device works like a cycling switch, i.e., once the user has selected the temperature at which he or she wants the inside of the cavity of the oven 1 to be, the control unit 30 maintains the temperature by establishing on/off cycles of the circuit associated with the function of the oven 1 selected, by means of opening and closing the input relay 13 associated with the circuit in question. The higher differential and the lower differential define the hysteresis between the maximum temperature causing the input relay 13 to open and the minimum temperature causing the input relay 13 to close.

In a third embodiment of the control device shown in FIG. 3, the control device comprises only one input relay 13 connected in series with all the switches 16 of the rotary position switch 10, so that when the temperature inside the cavity of the oven 1 is greater than the maximum temperature, the input relay 13 opens, such that all the circuits associated with all the functions of the oven 1 would be open.

In the first embodiment, the control device comprises at least one output relay 14 arranged in series with at least one switch 16 of the rotary position switch 10 and after the switch 16, the control unit 30 being configured for opening the output relay 14 when it detects an anomalous operation of the control device.

The control unit 30 is configured for detecting malfunctions in the operation of the control device, so that if any of the elements of the control device were to fail, the control unit 30 opens the output relay 14, so that the output relay 14 works like a safety switch.

In another embodiment of the control device, the control unit 30 is configured for actuating the electric motor 11 until the rotary position switch 10 is positioned in a position other than the position corresponding to the function selected by means of the actuator 21 when the temperature inside the cavity of the oven 1 is far from the target temperature, and for actuating again the electric motor 11 until the rotary position switch 10 is positioned in the position corresponding to the function selected by means of the actuator 21 when the temperature inside the cavity of the oven 1 is close to the target temperature. Therefore, the thermal response of the oven 1 is improved. When switching on the oven 1, for example, at which time the temperature inside the cavity of the oven 1 is far from the target temperature, and until the temperature inside the cavity of the oven 1 is close to the target temperature, if the function selected is the grill, the control unit 30 would actuate the electric motor 11 until the rotary position switch 10 is positioned in the position corresponding to the double grill function until the temperature inside the cavity of the oven 1 is close to the target temperature, thereby improving the thermal response of the oven 1 given that the target temperature would be reached more quickly. Once the temperature inside the cavity of the oven 1 is close to the target temperature, the control unit 30 would again actuate the electric motor 11 until the rotary position switch 10 is positioned in the position corresponding to the grill function. The control unit 30 works in this way in other situations in which the thermal response can also be improved, such as when the door of the oven 1 is opened, or when a large quantity of food is introduced in the cavity of the oven 1, thus causing the temperature therein to drop.

The following clauses disclose in an unlimited way additional embodiments.

Clause 1: Control device fora household oven 1, comprising

- a control panel 20 comprising
  - at least one actuator 21 configured for selecting at least one function of the oven 1 and generating an electrical signal identifying the function of the oven 1 selected, and
- a control unit 30 in communication with the control panel 20 configured for receiving the electrical signal generated by the actuator 21 and identifying from said electrical signal the function of the oven 1 selected by means of the actuator 21, the control unit including a rotary position switch 10 configured for rotating and being positioned in a plurality of discrete positions, one of said discrete positions being a reference position, so that in each of said positions the rotary position switch 10 activates at least one function of the oven 1 and in the reference position the rotary position switch 10 does not activate any function of the oven 1, and an electric motor 11 configured for rotating the rotary position switch 10 and positioning it in one of said discrete positions, the control unit 30 being configured for actuating the electric motor 11 until the rotary position switch 10 is positioned in the position corresponding to the function selected by means of the actuator 21.

Clause 2: Control device according to clause 1, wherein the control unit 30 is configured for identifying the reference position from among all the discrete positions, so that each discrete position in which the rotary position switch 10 is positioned is identified based on the number of positions the rotary position switch 10 has been rotated by the electric motor 11 with respect to the reference position.

Clause 3: Control device according to clause 2, wherein the control unit 30 comprises a memory configured for storing the discrete position in which the rotary position switch 10 is positioned.

Clause 4: Control device according to clause 2 or 3, wherein the control unit 30 is configured for actuating the electric motor 11 until the rotary position switch 10 is positioned in the reference position, and then for actuating the electric motor 11 until the rotary position switch 10 is positioned in the position corresponding to the function selected by means of the actuator 21 after an interruption in the power supply.

Clause 5: Control device according to any of the preceding clauses, comprising a position sensor 12 for the rotary position switch 10 in communication with the control unit 30, configured for providing to the control unit 30 an initial position of the rotary position switch 10, which is the position in which the rotary position switch 10 is located, the control unit 30 being configured for actuating the electric motor 11 until the rotary position switch 10 is positioned in the position corresponding to the function selected by means of the actuator 21 from the initial position.

Clause 6: Control device according to clause 5, wherein the position sensor 12 is integrated in the rotary position switch 10.

Clause 7: Control device according to clause 5, wherein the position sensor 12 is integrated in the electric motor 11.

Clause 8: Control device according to any of clauses 5 to 7, wherein the position sensor 12 is a potentiometer.

Clause 9: Control device according to any of clauses 5 to 7, wherein the position sensor 12 is a rotary encoder.

Clause 10: Control device according to any of the preceding clauses, wherein the electric motor 11 is directly attached to the rotary position switch 10.

Clause 11: Control device according to clause 10, wherein the electric motor 11 is coaxially attached to the rotary position switch 10.

Clause 12: Control device according to any of the preceding clauses, wherein the control panel 20 is an electronic panel.

Clause 13: Control device according to any of the preceding clauses, wherein the function of the oven 1 is selected by pushing on the actuator 21.

Clause 14: Control device according to clause 13, wherein the actuator 21 is a button.

Clause 15: Control device according to clause 13, wherein the actuator 21 is a capacitive touch sensor.

Clause 16: Control device according to any of clauses 1 to 12, wherein the actuator 21 is a rotary knob.

Clause 17: Control device according to any of clauses 1 to 13, wherein the control panel 20 comprises at least one touch screen, the actuator 21 being an area of said touch screen.

Clause 18: Control device according to any of the preceding clauses, wherein the control unit 30 is configured for receiving an electrical signal identifying a temperature inside a cavity of the oven 1 generated by a temperature sensor, and identifying from said electrical signal the temperature inside the cavity of the oven 1, the rotary position switch 10 comprising a plurality of switches 16, each switch 16 being associated with a circuit into which a load 15 corresponding to a function of the oven 1 is fed, the control device comprising at least one input relay 13 arranged in series with at least one switch 16 of the rotary position switch 10 and before said switch 16, the control unit 30 being configured for opening the input relay 13 when the temperature inside the cavity of the oven 1 is greater than a maximum temperature and for closing the input relay 13 when the temperature inside the cavity of the oven 1 is less than a minimum temperature, the maximum temperature being equal to a target temperature selected through a temperature actuator plus a higher differential, and the minimum temperature being equal to the target temperature minus a lower differential.

Clause 19: Control device according to clause 18, wherein the control device comprises at least one output relay 14 arranged in series with at least one switch 16 of the rotary position switch 10 and after said switch 16, the control unit 30 being configured for opening the output relay 14 when it detects an anomalous operation of the control device.

Clause 20: Control device according to clause 18 or 19, wherein the control unit 30 is configured for actuating the electric motor 11 until the rotary position switch 10 is positioned in a position other than the position corresponding to the function selected by means of the actuator 21, and for actuating the electric motor 11 again until the rotary position switch 10 is positioned in the position corresponding to the function selected by means of the actuator 21 when the temperature inside the cavity of the oven 1 is close to the target temperature.

What is claimed is:

1. A method for controlling an oven, the method comprising:

selecting a first function of the oven using an actuator located in or on a control panel of the oven to cause a first electrical signal to be generated that identifies a first function of the oven;

in response to the first electrical signal being generated, energizing an electrical motor that is mechanically coupled to a rotary position switch, the rotary position switch configured to be rotated by the electric motor and to be positioned in a plurality of discrete positions, the plurality of discrete positions including a first discrete position corresponding to a reference position and a second discrete position corresponding to the first function of the oven, when in the first discrete position the rotary position switch does not activate any function of the oven, when in the second discrete position the rotary position switch is configured to activate the first function of the oven, upon the electric motor being energized the electric motor causing the rotary position switch to rotate from the first discrete position to the second discrete position.

2. The method for controlling an oven according to claim 1, wherein the plurality of discrete positions of the rotary position switch includes a third discrete position corresponding to a second function of the oven, when in the third discrete position the rotary position switch activates the second function of the oven, the electric motor configured to rotate the rotary position switch between the first, second and third discrete positions, the method further comprising:

selecting the second function of the oven using the actuator to cause a second electrical signal to be generated that identifies a second function of the oven;

after the second electrical signal is generated, energizing the electrical motor to cause the rotary position switch to rotate to the third discrete position.

3. The method for controlling an oven according to claim 1, further comprising determining a current position of the rotary position switch using a position sensor coupled to the rotary position switch.

4. The method for controlling an oven according to claim 1, further comprising determining a current position of the rotary position switch using a position sensor integrated in the rotary position switch.

5. The method for controlling an oven according to claim 1, further comprising determining a current position of the rotary position switch using a position sensor integrated in the electric motor.

6. The method for controlling an oven according to claim 3, wherein the position sensor is a potentiometer.

7. The method for controlling an oven according to claim 3, wherein the position sensor is a rotary encoder.

8. The method for controlling an oven according to claim 1, wherein the actuator is a push button.

9. The method for controlling an oven according to claim 1, wherein the actuator is a capacitive touch sensor.

10. The method for controlling an oven according to claim 1, wherein the actuator is a rotary knob.

11. The method for controlling an oven according to claim 1, wherein the control panel includes a touch screen, the actuator being an area of the touch screen.

12. The method for controlling an oven according to claim 1, wherein the oven includes an input relay and the rotary position switch includes a plurality of switches, each of the plurality of switches being associated with a circuit into which a load corresponding to a function of the oven is fed, the input relay being arranged in series with at least one of the plurality of switches, the method further comprising monitoring a temperature inside the a cavity of the oven and opening the input relay upon the temperature inside the cavity of the oven being greater than a maximum temperature and to close the input relay when the temperature inside the cavity of the oven is less than a minimum temperature.

13. The method for controlling an oven according to claim 12, wherein the maximum temperature is equal to a target temperature selected through a temperature actuator plus a higher differential, and the minimum temperature being equal to the target temperature minus a lower differential.

14. The method for controlling an oven according to claim 13, wherein upon the temperature inside the cavity of the oven being close to the target temperature, actuating the electric motor until the rotary position switch is positioned in a position other than the second discrete position, and to thereafter actuate the electric motor until the rotary position switch is positioned in the second discrete position when the temperature inside the cavity of the oven is close to the target temperature.

* * * * *